INVENTORS
ROBERT H. CHERRY
ALBERT J. WILLIAMS JR
BY
Woodcock and Phelan
ATTORNEYS March 21, 1950　　　R. H. CHERRY ET AL　　　2,501,263
CONSTANT VOLTAGE REGULATING SYSTEM Filed Aug. 29, 1946　　　　　　　　　　2 Sheets-Sheet 2

INVENTORS
ROBERT H. CHERRY
ALBERT J. WILLIAMS
BY
Woodcock and Phelan
ATTORNEYS

Patented Mar. 21, 1950

2,501,263

UNITED STATES PATENT OFFICE 2,501,263

CONSTANT VOLTAGE REGULATING SYSTEM

Robert H. Cherry, Glenside, and Albert J. Williams, Jr., Philadelphia, Pa., assignors to Leeds and Northrup Company, Philadelphia, Pa., a corporation of Pennsylvania Application August 29, 1946, Serial No. 693,788

5 Claims. (Cl. 323—75)

This invention relates to regulating systems for deriving, from variable sources, a voltage or current whose constancy is of such high degree it may be used in precision measurements or for other purposes requiring a source of constant voltage or current.

Many types of measuring or monitoring systems require a constant voltage or current as a reference standard and it is desirable, particularly for installations which are unattended except at relatively infrequent intervals, to derive the reference voltage or current from sources which are available for power or other purposes, such as generators driven from internal-combustion engines, commercial power lines, or the like, but which are inherently subject to variations rendering them unsuited for use as reliable or accurate standards.

In accordance with the present invention, the desired objective is attained by a regulator system requiring no more than a few readily procurable standard components but which nevertheless holds the output voltage or current at a substantially fixed magnitude, for example, within one per cent, despite variations of input voltage or frequency which are even greater than those usual for commercial power lines.

More particularly, the regulating system includes two regulating devices, each of whose resistance varies as a function of the current traversing it, which are interconnected in a network including the load and means for deriving, from the input voltage, two voltages each of which varies with the input voltage and which are proportioned to afford, by the mutual regulation of both devices, a stable load voltage. More specifically, and in a preferred form of the invention, the resistance of one of said devices increases with increase of current through it, whereas the resistance of the other of said devices decreases with current through it; the former is connected in series with the load and one of said sources, and both devices are connected in series with each other and with the two sources of voltage.

The invention further resides in features of combination and arrangement hereinafter described and claimed.

Figure 1:
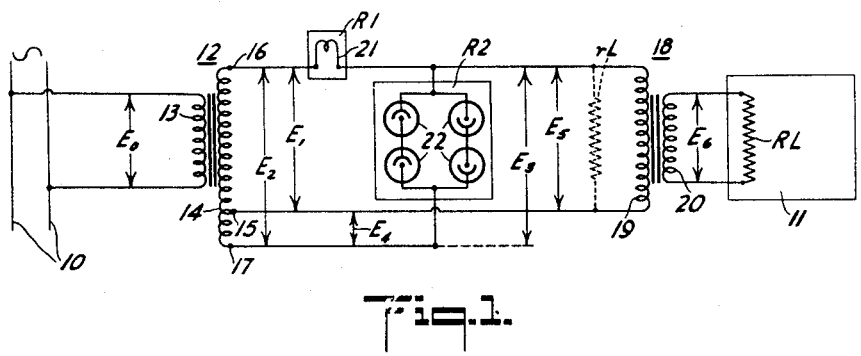
Figure 2:
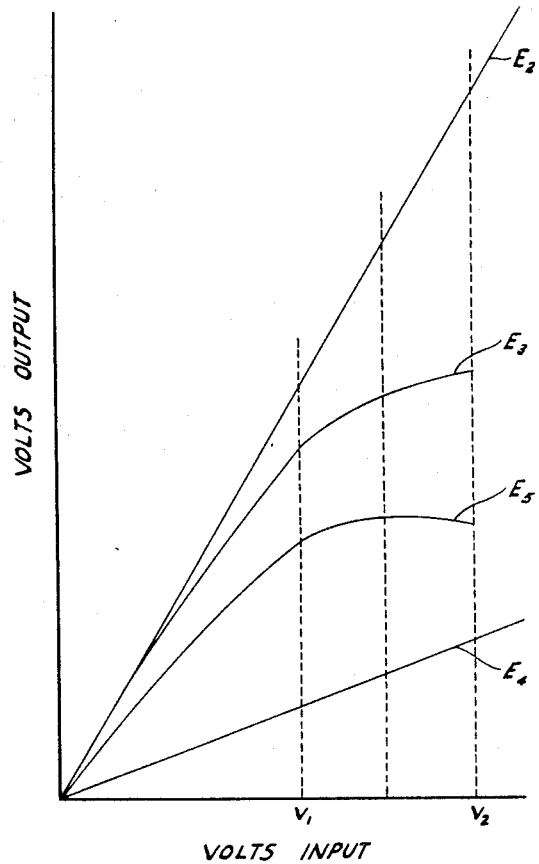

For a more detailed understanding of the invention and for illustration of several forms thereof, reference is made to the accompanying drawings in which:

Fig. 1 schematically illustrates a regulating system for use with an alternating-current source;

Fig. 2 comprises curves referred to in discussion of the characteristics of the system of Fig. 1; and Figs. 3, 4, 5, and 6 are circuit diagrams of modifications of the system of Fig. 1.

Referring to Fig. 1, it is assumed for purposes of explanation that the source comprising conductors 10 is, for example, a 110-volt, 60-cycle line or a small alternator driven by an internal-combustion engine from which it is desired to supply a measuring network 11 with a voltage or current which remains fixed at a desired value, or at least which remains constant within narrow limits notwithstanding substantial variations in the frequency and magnitude of the voltage of the source. The measuring network may be of any of the usual types, such, for example, as a bridge circuit, a potentiometer circuit or the like, whose resistance as viewed from its input terminals is generically represented by load resistance RL: more particularly, the measuring network may be of the type shown in co-pending Cherry application, Serial No. 608,284.

The transformer 12, having its primary winding 13 connected to the conductors 10 and its secondary winding 14 connected to the regulator network later described, is of the step-up type to provide voltages and currents within the regulating network which are suitaed to the characteristics and current-carrying capacities of the regulating devices to be used. The secondary winding is tapped at 15 to provide a voltage $E_1$ between its terminals 15 and 16 which varies with the line voltage $E_0$ and also to provide a voltage $E_4$ between its terminals 15 and 17, which varies with the line voltage $E_0$. Transformer 12 may be an auto-transformer. In either case, the tapped secondary 14 may be considered as means for deriving two components ($E_1$ and $E_4$) of voltage $E_2$ each varying proportionally to line voltage $E_0$.

In a particular case, the load resistance RL was low, of the order of 13.5 ohms, and it was desired to apply to it a constan voltage of about 12 volts to effect flow therethrough of a constant current of about 0.9 ampere. Because of such relatively low voltage and high current requirements, the load resistance RL is not directly connected in the regulator network but is reflected therein, by step-down transformer 18, as a high load resistance $rL$ requiring low current and high voltage. The transformer 18 has its primary 19 energized from the regulator network and its secondary 20 is in circuit with the load RL. Because of the interposition of the transformer 18, the resistance of the network 11 as seen at the output terminals of the regulator is, as above stated, a high resistance $rL$ to which is applied the regulator voltage $E_5$ which, for purposes of discussion, will be considered as the output voltage of the regulator rather than the voltage $E_6$ applied to the actual load resistance RL. The ratio of the voltages $E_5$ and $E_6$ is fixed by the ratio of the transformer 18 and hence either of them may be considered as the regulator output voltage in the same way that either of voltages $E_0$ or $E_1$ may be considered the input voltage of the regulator.

The regulating device R1 may conveniently comprise one or more metallic filament lamps, for example tungsten lamps, having high positive temperature coefficient of resistance: any other form of resistor having such characteristic may be used. In consequence, the resistance of the regulating device R1 varies as a direct function of the current traversing it, increasing with increase of current and decreasing with decrease of current. This regulating device is connected in series with the load resistance $rL$ and that portion of the secondary winding between the terminals 15 and 16 which supplies the voltage $E_1$.

The second regulating device R2 may comprise two groups of gaseous discharge tubes 22 in series-parallel relation, the number of tubes in series in each group being selected in accordance with the voltage to be applied; the groups are in parallel and reversely poled to allow current to flow through the regulating device R2 in both directions; that is, the two groups of tubes are alternatively conductive for successive half cycles of the applied voltage which is the voltage $E_2$ less the voltage drop across the regulating resistance R1. In cases where the regulation requirements are not so severe, the tubes 22 may be ordinary neon bulbs but in the particular system of Fig. 1 they are those known as VR-150's.

The regulating device R2 is in series with the regulating device R1 and the two sources which provide the voltages $E_1$ and $E_4$. The current through the regulating resistance R1, therefore, comprises two components: one which traverses the load resistance $rL$ and the other which traverses the gaseous discharge regulator R2. Assuming, for example, there is a sudden increase in line voltage, the voltage across the gaseous discharge tubes 22 tends to rise and the current through the tubes quickly increases to maintain the voltage substantially constant in accordance with the regulating characteristic of this type of tube. Both components of current through the regulating device R1 are, therefore, increased, the load current increasing because of the increase in magnitude of the voltage $E_1$ and the regulating-current component increasing because of the decreased resistance of the regulating device R2. If the line voltage remains high for an appreciable length of time, the regulating load imposed on the gaseous discharge tubes is in part relieved as the resistance of the lamp or lamps 21 more slowly but continuously increases until the system again comes into equilibrium. The gaseous discharge tubes provide a regulating device which acts quickly to suppress the effect of changes in the input voltage $E_0$ upon the output voltage $E_5$, but for sustained change in input voltage the more slowly regulating device R1 takes over part of the regulating action. The two regulating devices continuously cooperate in maintenance of a load voltage which is constant over a wide range of variation of the input voltage $E_0$ and for both slow and rapid variations thereof provided the load resistance remains substantially constant.

The quality of regulation attainable with this simple system can best be appreciated by a discussion of Fig. 2. As shown by curve $E_2$ of Fig. 2, the output voltage of the transformer 12 varies substantially directly with the input voltage $E_0$. The voltage $E_3$ as measured from the terminal 17 of the transformer's secondary 14 to the output side of the regulating device R1, though subject to less variation than voltage $E_2$, is not sufficiently constant through the expected range $V_1$—$V_2$ of variation of the input voltage to be satisfactory for use as a reference standard. However, by providing the source of voltage $E_4$, which voltage also varies substantially similarly with the voltage $E_0$, and by so interconnecting the regulating device, the voltage source, and the load that the output voltage $E_5$ applied to the load resistance $rL$ is the difference of the voltages $E_3$ and $E_4$, there is obtained the regulation characteristic indicated by the output voltage curve $E_5$ of Fig. 2, which, between the limits $V_1$—$V_2$ of the input voltage $E_0$, is substantially constant. Actually, and as shown, the characteristic obtained is slightly concave downward but by adjustment or selection of location of the tap 15, the maximum may be brought substantially midway, or at any other desired normal operating point, between the limits $V_1$ and $V_2$. As shown in Fig. 2 and as appears from Table B, below, the variation of voltage $E_4$, between the limits $V_1$—$V_2$ of the input voltage, closely approximates the variation of the regulated voltage $E_3$. Otherwise expressed, the slope of input-output curve $E_4$, as determined by location of tap 15, closely approximates the slope of the input-output curve $E_3$ with the result the load voltage $E_5$ is to high degree constant between the limits $V_1$—$V_2$ of the supply voltage $E_2$.

The specific values of output voltage $E_5$ obtained for various input voltages $E_0$ appear in Table A below:

Table A

| Input Voltage $E_0$ | Output Voltage $E_5$ |
|---|---|
| Volts R. M. S. | Volts. R. M. S. |
| 90 | 168.5 |
| 95 | 169.5 |
| 100 | 169.5 |
| 105 | 169.5 |
| 110 | 170.5 |
| 115 | 170.0 |
| 120 | 169.0 |
| 125 | 169.0 |
| 130 | 167.5 |

As the expected variations of line voltage are from about 100 volts to 125 volts, it thus appears that the output voltage varies by much less than one per cent; of precision suited for most measuring systems. In a particular arrangement affording these results, the regulating device R2 comprised four gaseous discharge tubes of the VR-150 type and the regulating device R1 comprised two 10-watt, 115-volt tungsten lamps in series. The relations between the input voltage, the output voltage, and other voltages in the network and the current through the tubes 22 is shown by Table B below:

*Table B*

| $E_0$ | $E_3$ | $E_4$ | $E_5$ | I (R2) |
|---|---|---|---|---|
| Volts | Volts | Volts | Volts | Milliamperes |
| 90 | 234.5 | 66 | 168.5 | 20.0 |
| 95 | 238.5 | 69 | 169.5 | 20.0 |
| 100 | 242.5 | 73 | 169.5 | 20.0 |
| 105 | 246.5 | 77 | 169.5 | 20.0 |
| 110 | 250.5 | 80 | 170.5 | 22.2 |
| 115 | 254.0 | 84 | 170.0 | 25.0 |
| 120 | 257.0 | 88 | 169.0 | 28.2 |
| 125 | 260.0 | 91 | 169.0 | 31.0 |
| 130 | 262.5 | 95 | 167.5 | 33.8 |

Inasmuch as neither of the regulating devices is to any extent reactive, the regulation characteristic of the system is also substantially independent of any changes in the frequency of voltage $E_0$. The relations of the input and output voltages for different frequencies and magnitude of the input voltage are shown in Table C:

*Table C*

| | Input Voltage in per cent Normal $E_0$ | | | |
|---|---|---|---|---|
| | 83 | 91 | 100 | 109 |
| | Output Voltage in per cent Normal $E_5$ | | | |
| Frequency: | | | | |
| 55 cycles/sec | 98.8 | 99.7 | 99.8 | 99.7 |
| 60 cycles/sec | 99.1 | 99.8 | 100.0 | 99.9 |
| 65 cycles/sec | 99.2 | 100.0 | 100.2 | 100.1 |

It shall be understood the two voltages $E_1$ and $E_4$ may be obtained by means other than the tapped secondary 14: for example, they may be obtained from separate windings of a transformer, from different transformers or from an auto transformer. The essential relation is that voltages $E_1$ and $E_4$, however derived, shall both vary similarly with the line voltage $E_0$ and that the variation of voltage $E_4$ shall closely approximate the variation of voltage $E_3$ within the limits $V_1—V_2$ of the range of variation of the supply voltage.

Figure 3:
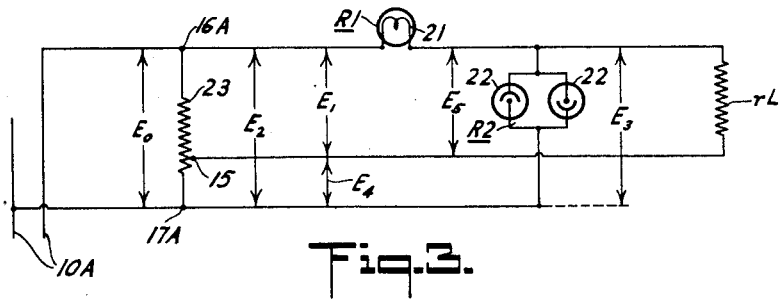

The invention is not limited to derivation of a standard voltage or current from alternating-current sources. As shown in Fig. 3, the standard voltage $E_5$ may be derived from an alternating-current source or from a direct-current source comprising conductors 10A. The two voltages $E_1$ and $E_4$ for connection to the regulating devices and to the load resistance, generally as described in connection with Fig. 1, are in this modification derived from a voltage-dividing resistor 23. Further explanation of the operation of this system seems unnecessary as the two regulating devices R1 and R2 have the same individual and joint regulating functions described in connection with Fig. 1. It should be noted that provision of the reversely poled gaseous discharge tubes 22, 22 makes the poling of the input connections of the regulator system to the conductors 10A of a direct-current source a matter of no consequence: if one of the tubes or set of series-tubes 22 is omitted, it is then necessary to observe proper poling in connecting the regulating system to a direct-current power supply if the tubes 22 are of the asymmetrically conductive type. With reversely poled asymmetrically conductive tubes, the resistor R comprising them is symmetrically conductive.

Figure 4:
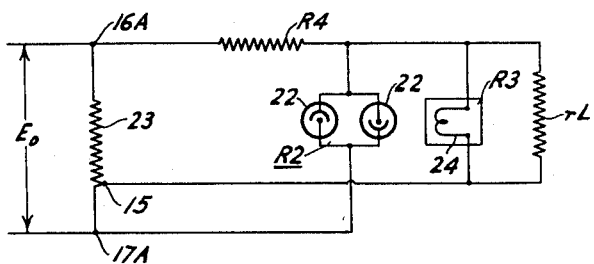
Figure 5:
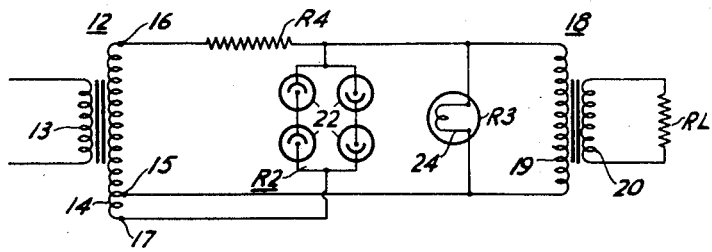

Except for a shunt-regulating device R3, the modification of Fig. 4 is similar to Fig. 3, and the modification of Fig. 5 is similar to Fig. 1. Consequently, the foregoing description may be referred to in connection therewith and the additional or alternative features will now be described with reference to both Figs. 4 and 5. In those figures, there is connected in parallel with the load resistance rL a regulating device R3 whose resistance varies as an inverse function of the current through it. An untreated carbon filament lamp is one example of this type of resistor. In this form of the invention, the resistor R4, in series with the load, may be a metallic filament lamp such as comprised in the regulator R1 of preceding figures, or it may be an ordinary type of resistor having little, if any, significant change in resistance with flow of current through it.

Assuming the latter case, it appears that upon sudden increase of input voltage there is at once an increased flow of current through the regulator tubes 22 which minimizes the effect of the change of input voltage upon the current through the load resistance rL. The effect of increased voltage also tends to increase the current through the carbon filament lamp 24 and as this resistance becomes less with increased current through it, the effect of the increased voltage is to cause a greater and greater percentage of the current to flow through the lamp 24. The combined effect of the two regulating devices R2 and R3 is to maintain the current to the load resistance rL substantially constant. Inasmuch as resistance R3, however, is not in series with the regulating device R2, it does not, as in the preceding modifications, relieve the gaseous discharge tubes 22 from sustained increased input voltage. It is for that reason desirable in the modifications of Figs. 4 and 5 to use metallic filament lamps 21 or equivalent resistor having positive temperature coefficient of resistance for the series resistance R4. Because including transformers 12 and 18, the modification shown in Fig. 5 is suitable for use only with alternating-current sources, whereas with the modification shown in Fig. 4, the source of voltage $E_0$ may be either direct or alternating.

Figure 6:
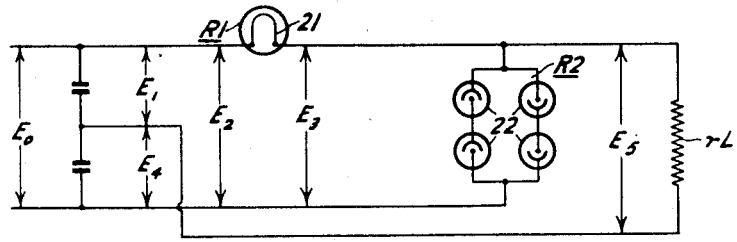

The system shown in Fig. 6 is generally similar to all of the preceding modifications and particularly corresponds with Figs. 1 and 3 except that the voltages $E_1$ and $E_4$ are derived from input voltage $E_0$ by voltage-divider 25 of the type comprising serially-connected capacitors.

In any of the systems shown, the slope of the voltage curve $E_4$ of Fig. 2 may be modified by inclusion of resistance in the lead to tap or point 15 from the load; furthermore, the shape of the curve $E_4$ may be made non-linear if such resistance varies as a function, direct or inverse, of the current through it. If the resistance varies as a direct function of current, the compensation of the output voltage $E_5$ for transient changes is even more nearly perfect.

It shall be understood the invention is not limited to the particular arrangements shown and that further modifications and changes may be made within the scope of the appended claims.

What is claimed is:

1. A regulating system for deriving a substantially constant load voltage from a source subject to a range of voltage variation comprising two serially-connected resistors whose resistances respectively vary directly and inversely with current therethrough, means applying the supply voltage to said resistors to produce across the latter resistor a regulated voltage which for said range of variation of supply voltage varies over a substantially smaller range, means for dividing said supply voltage into two components one of which has substantially the same variation as said regulated voltage, and means for applying the other component of the supply voltage to the load through the other of said serially-connected resistors.

2. A regulating system for deriving a substantially constant load voltage from a source subject to a range of voltage variation comprising two serially-connected resistors the resistance of one of which varies inversely with current therethrough, means for applying the supply voltage to said resistors to produce across said one of them a regulated voltage which for said range of variation of supply voltage varies over a substantially smaller range, means for dividing said supply voltage into two components one of which has substantially the same variation as said regulated voltage, a resistor whose resistance varies inversely with current therethrough, and means for applying the other component of the supply voltage to said load and last-named resistor in parallel through the other of said serially-connected resistors.

3. A regulating system for deriving a substantially constant load voltage from a source subject to a range of voltage variation comprising resistance means whose resistance varies inversely with current therethrough, means for applying the supply voltage to a circuit including said resistance means to produce across it a regulated voltage which for said range of variation of supply voltage varies over a substantially smaller range, means for dividing said supply voltage into two components one of which has substantially the same variation as said regulated voltage, a second resistance means whose resistance varies with current therethrough, and means for applying the other component of the supply voltage to the load in a circuit including said second resistance means.

4. A regulating system for deriving a substantially constant load voltage from an alternating current source subject to a range of voltage variation comprising two serially-connected resistors whose resistances respectively vary directly and inversely with current therethrough, transformer means for deriving two voltages each varying proportionally to the voltage of said source, means for applying the summation of said two derived voltages to said resistors to produce across the latter of them a regulated voltage which for said range of variation of supply voltage varies over a substantially smaller range corresponding with the range of variation of one of said derived voltages, and means for applying the other of said derived voltages to the load through the other of said serially-connected resistors.

5. A regulating system for deriving a substantially constant load voltage from a source subject to voltage variation which source may be of alternating current or of direct current having either poling which comprises two serially-connected symmetrically conductive resistors whose resistances respectively vary directly and inversely with current therethrough, potential-dividing resistance means for deriving two voltages each varying proportionally to the voltage of said source, means for applying the summation of said two derived voltages to said serially-connected resistors to produce across the latter of them a regulated voltage which for said range of variation of supply voltage varies over a substantially smaller range corresponding with the range of variation of one of said derived voltages, and means for applying the other of said derived voltages to the load through the other of said serially-connected resistors.

ROBERT H. CHERRY.
ALBERT J. WILLIAMS, Jr.

REFERENCES CITED

The following references are of record in the file of this patent:

UNITED STATES PATENTS

| Number | Name | Date |
| --- | --- | --- |
| 1,094,732 | Lyle | Apr. 28, 1914 |
| 1,094,733 | Lyle | Apr. 28, 1914 |
| 1,847,865 | Cornell | Mar. 1, 1932 |
| 1,961,746 | Edelman | June 5, 1934 |
| 2,086,910 | Hansell | July 13, 1937 |
| 2,407,458 | Spielman | Sept. 10, 1946 |

OTHER REFERENCES

Proceedings of the I. R. E., April 1945, pages 262–267.